US006146058A

United States Patent [19]

Gerst et al.

[11] Patent Number: 6,146,058

[45] Date of Patent: Nov. 14, 2000

[54] SEAL PROCESSING STATION FOR HARNESS MAKING MACHINE

[75] Inventors: Michael Gerst, Worms; Jörg Herzog, Gross-Zimmern; Hans-Peter Hoffmann, Gross-Zimmern; Horst Knapp, Gross-Zimmern; Hans Quiring, Pfungstadt; Wolfgang Zimmer, Darmstadt, all of Germany

[73] Assignee: The Whitaker Corporation, Wilmington, Del.

[21] Appl. No.: 09/011,707

[22] PCT Filed: Aug. 27, 1996

[86] PCT No.: PCT/IB96/00854

§ 371 Date: Feb. 17, 1998

§ 102(e) Date: Feb. 17, 1998

[87] PCT Pub. No.: WO97/08787

PCT Pub. Date: Mar. 6, 1997

[30] Foreign Application Priority Data

Aug. 29, 1995 [GB] United Kingdom .................. 9517587

[51] Int. Cl.[7] .................................................. B65G 53/60

[52] U.S. Cl. ............................................ 406/174; 29/474

[58] Field of Search ............................ 29/450, 754, 564, 29/747, 748, 749, 821; 221/211, 278; 406/174

[56] References Cited

U.S. PATENT DOCUMENTS

| | | | |
|---|---|---|---|
| 4,356,626 | 11/1982 | Waghorn | 29/747 |
| 5,083,369 | 1/1992 | Cerda | 29/857 |

FOREIGN PATENT DOCUMENTS

| | | | |
|---|---|---|---|
| 2 595 028 | 8/1987 | France | H05K 13/06 |
| 2 670 620 | 6/1992 | France | H01R 43/048 |
| 37 21 634-A1 | 1/1989 | Germany | H05K 13/06 |
| 658 549-A5 | 11/1986 | Switzerland | H01R 13/42 |

OTHER PUBLICATIONS

See PCT International Search Report for any references that are not enclosed herewith.

*Primary Examiner*—Kenneth W. Noland

[57] ABSTRACT

A seal processing station for gathering loose and transmitting properly oriented seals to an insertion station where the seals are to be placed on a wire, the seal processing station having a seal sorting unit and a seal feeding unit that has a feed track going between the seal sorting unit and the insertion station where the seal sorting unit has a container where the loose seals are placed and a seal propulsion device with a seal feed channel extending from a lower end of the container to an upper end where the channel includes an air inlet for blowing air up the channel to feed seals from the lower end to the upper end and unto the feed track.

7 Claims, 4 Drawing Sheets

SEAL PROCESSING STATION FOR HARNESS MAKING MACHINE

BACKGROUND OF THE INVENTION

1. Field of the Invention

This invention relates to a machine for feeding and assembling seals to wires, for example single wire to electrical or fibre optic wires.

2. Summary of the Prior Art

Many electrical or optical connectors are provided with individual seals positioned around the wires for sealing such wires within a housing. Single wire seals are often assembled to the end of a wire prior to mounting of a terminal or ferrule to the wire end. Assembly of seals to wire ends thus often occurs in a harness-making-machine, as one of the processing steps in the manufacture of a harness.

Seals are typically made of elastomeric material, and they are inserted over the wire end by expanding the seals over a hollow tube within which the wire end is fed, subsequently pushing the seal off the tube onto the wire, and retracting the wire from the tube for further processing. In order to increase automation of the assembly procedure, the individual seals are sometimes mounted on a flexible support strip and fed as bandware to the seal insertion station. An alternative seal feeding method is to have a seal sorting station comprising a tumbling container and a feed track. Loose seals are tumbled by the tumbling container onto the vibrating track that captures the loose seals and feeds them to the seal insertion station. The latter procedure has the advantage of avoiding assembly of seals to a support strip thereby reducing costs and material waste.

Certain harness-making-machines have a modular construction where various processing stations such as crimping stations, wire end stripping stations and seal assembly stations are positioned in a juxtaposed manner, the type and number of stations depending on the complexity and level of automation required to manufacture a harness. In order to reduce space usage, cost and cycle time, it is advantageous to produce compact stations, in particular with regards to their width in the wire transporting direction, such that many stations can be positioned adjacent each other over a short distance. One of the problems with tumblers, is that the tumbling movement requires space, in particular a relatively large width in the wire transporting direction.

Many harness-making-machines transport wires to different stations by means of grippers holding the wire ends and fed by a conveyor or other transport system. At a processing station, the wire end is often moved to accomplish the processing operation. In order to increase simplicity of the conveying system that grips and feeds the wire ends, it is often more advantageous to reduce the amount of movement of the wire end thereby enabling provision of simpler grippers and faster cycle time.

SUMMARY OF THE INVENTION

It is an object of this invention to provide a compact, reliable and effective seal processing machine, in particular compact with regards to its space requirements in the direction of conveyance of a harness-making-machine.

It is another object of this invention to provide a seal processing machine that reduces the complexity of the overall harness making machine, by limiting the need to move the wire end during processing.

Objects of this invention have been achieved by providing a seal processing station comprising a seal sorting and feeding unit that comprises a container for receiving loose seals therein, the seal feeding unit further comprising an air feed for feeding seals from a bottom end of the container to a top end whereby a seal feeding track projects into a lower part of the container for receiving seals that fall thereonto from the top of the container. The upper part of the container above the feeding track may be separated from the lower part of the container, by a wall having an outlet for allowing a controlled flow of seals from the top part of the container into the lower part of the container. An adjustment plate can be positioned below the outlet and can be adjusted to different heights to vary the flow of seals, and in an advantageous embodiment the adjustment plate can be made to move or vibrate to prevent seals from potentially blocking the outlet.

Other objects of this invention have been achieved by providing a seal processing station comprising a seal insertion unit having a seal insertion device comprising a first tube concentrically mounted over a pin, and a second tube concentrically mounted over the first tube each of the tubes being axially slidable with respect to each other. A seal having a cavity extending therethrough can be inserted over the pin and then over the first tube.

To assemble the seal to a wire end, the pin is retracted within the first tube, the insertion device advanced towards a wire end that is stationary, until the wire projects within a cavity of the first tube, whereby the second tube is then advanced over the first tube thereby pushing the seal off the first tube onto the wire end.

DETAILED DESCRIPTION OF THE PREFERRED EMBODIMENT

Figure 1:
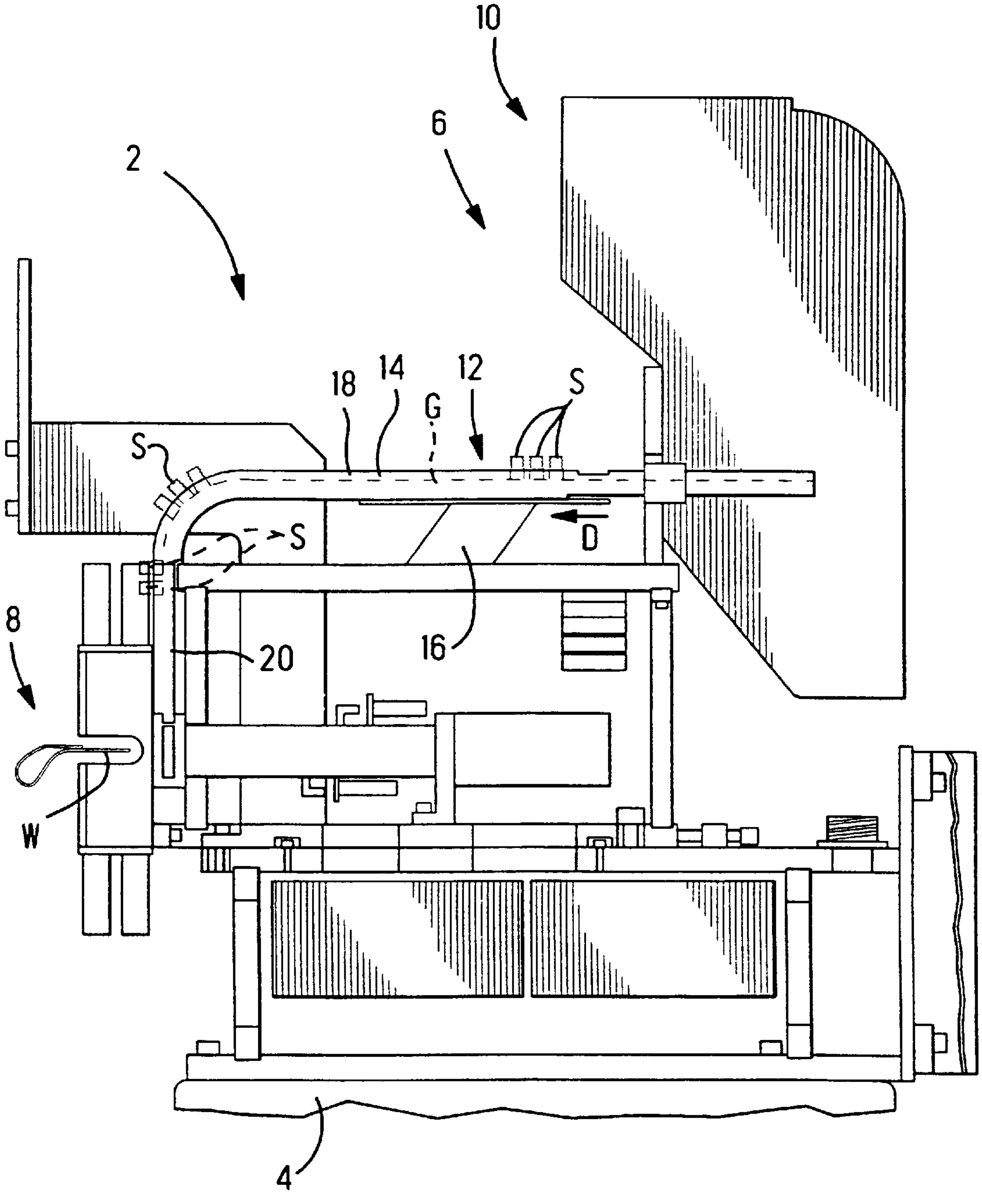
FIG. 1 is a side view of a seal processing station mounted on a base of a harness-making-machine.

Referring first to FIG. 1, a seal processing station 2 is mounted on a base frame 4 of a harness-making-machine. The harness-making-machine comprises a linear conveying system (not shown) that carries wire ends W in a linear direction that is perpendicular to the plane of the paper when referring to FIG. 1. This shall be called the wire conveying direction hereinafter. The seal processing station comprises a seal sorting and feeding unit 6 and a seal insertion unit 8. The seal sorting and feeding unit 6 comprises a sorting unit 10 and a feeding unit 12.

The feeding unit 12 comprises a track 14 that is supported on a vibrating device 16 that generates a particular vibratory movement to feed seals S in a direction D from the seal sorting unit 10 towards the insertion unit 8. The feed track 14 has a groove G within which the seals S are captured in a particular orientation. The profile of the groove G is adapted for feeding a distinct profile of seals S. The feeding track 14 has a linear horizontal portion 18 extending from the seal sorting unit 10, and bends through 90° into a vertical portion 20 that presents the seals at the insertion unit 8 such that cavities extending through the seals are aligned with the wire ends W.

Figure 2:
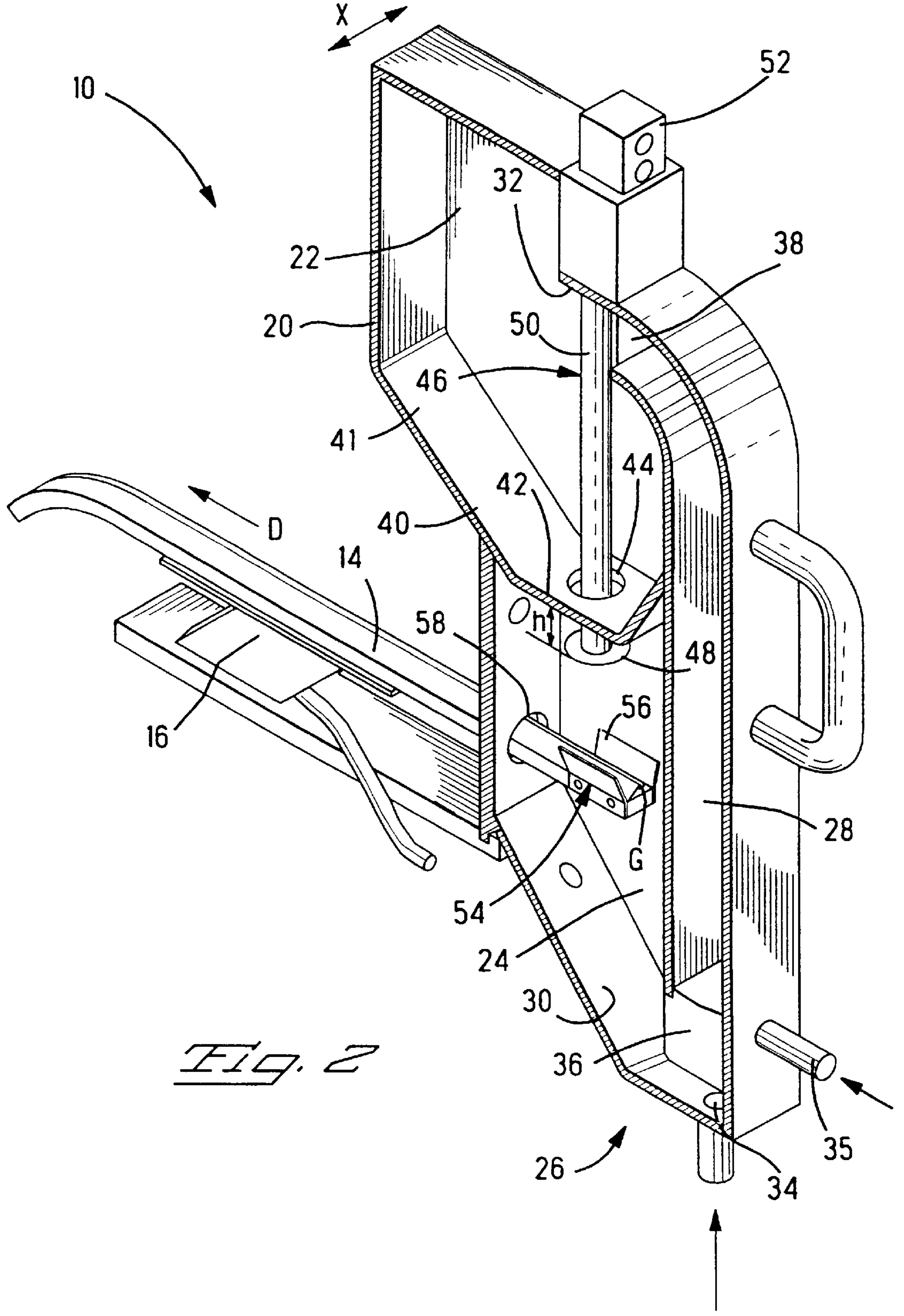
FIG. 2 is an isometric cross-sectional view of a seal sorting and feeding unit according to this invention.

Referring to FIG. 2, the seal sorting unit 10 comprises a container 20 that has an upper chamber 22 and a lower chamber 24, and a seal propulsion system 26 that comprises a channel 28 extending from a lower end 30 of the lower chamber 24, to an upper end 32 of the upper chamber 22. The seal propulsion system further comprises a compressed air inlet 34 at the lower end 30 and a venturi section 36 with a further air inlet 36, the venturi positioned in the channel 28 proximate the lower end 30. When air is blown through the inlet 36, the airflow through the venturi creates a lower static air pressure than atmospheric pressure found in the lower chamber 24, thereby sucking seals that fall onto the lower wall 30 into the channel 28, the seals being projected out of the channel at an outlet section 38 proximate the top wall 32 due to the dynamic pressure of the airflow. The air blowing through the inlet 36 prevents seals from blocking the lower end of the channel 28 and venturi.

The upper chamber 32 is separated from the lower chamber by a separation wall 40 that has a portion 41 inclined towards a bottom part 42 of the wall. The bottom part 42 has an outlet 44 communicating with the lower chamber 24. Loose seals in the upper chamber 22 thus flow through the outlet 44 into the lower chamber. A seal flow adjustment device 46 comprises a plate 48 positioned below the outlet 44 and separated therefrom by a gap H. The plate 48 is fixed to a bar 50 supported by a supporting unit 52 at the top of the container that enables adjustment of the height of the bar 50 to vary the gap H. The latter provides means of varying the flow of seals through the outlet 44. The supporting end 52 may be provided with a vibrating motor that vibrates or moves the bar 50 in a cyclical motion to loosen the seals in the event they block the outlet 44.

Below the outlet 44 and projecting into the lower chamber 24, is an end section 54 of the feed track 14. Many of the seals falling through the cutout 44 are captured by angled side plates 56 flanking the track 14 such that some of the seals fall into the groove G. The vibrator 16 causes movement of the seals in the direction D. If certain seals are not correctly orientated within the groove G, they either fall off the track 14 or are blown off by an air jet that blows across the track 14 at an outlet 58 of the container lower chamber 24.

The air driven seal propulsion system 26 and container with upper and lower chambers 22,24 to enable feeding of seals onto the slim feeding track 14, enables provision of a seal sorting and feeding unit of very low width X in the direction of conveying of the wires W. The compressed air seal feeder is also very simple in construction and therefore reliable, but also reduces the number of moving parts, in particular movement external of the container.

Figure 3A:
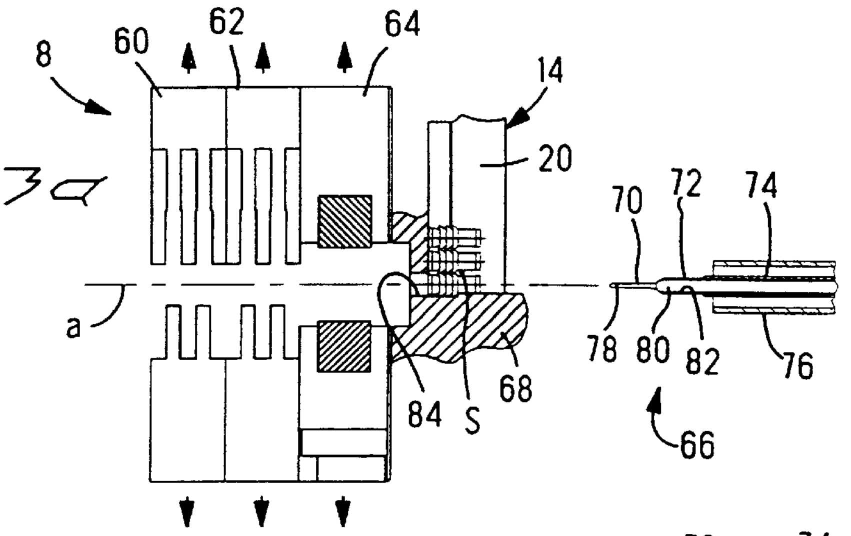
FIGS. 3*a*–3*f* are side views showing various steps in the insertion of a seal to a wire end by an insertion unit of the seal processing station.
Figure 3G:
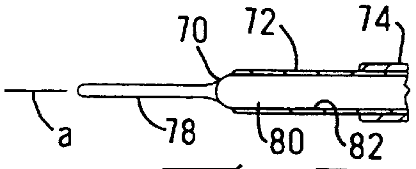
FIG. 3*g* is a partial detailed cross-sectional view of an insertion device.

Referring to FIGS. 3*a* and 3*g*, the seal insertion unit 8 will now be described. The insertion unit 8 comprises a wire gripper 60, a wire end centering clamp 62 and a seal abutment clamp 64, all three clamps openable and closable in a direction perpendicular to an axial axis A defining the longitudinal direction of the wire end W, seal S, and insertion device 66. The seals are fed down the vertical portion 20 of the track 14 until abutment with a base 68 that aligns one of the seals S with the axial axis A. The insertion device 66 comprises a central pin 70 around which is concentrically mounted a seal expansion tube 72, around which is further mounted a seal removal tube 74, the latter three members supported in a casing 76. The pin 70, seal expansion tube 72, and seal removal tube 74 are slidable with respect to each other in the axial direction, and the casing 76 which supports these members is also movable in the axial direction such that the device 66 can be moved to and away from the feeding track 14. The pin 70 has a small diameter leading end 78 of lesser diameter than a wire for assembly to the seal S, which enlargens into a larger diameter section 80 that has a diameter slightly greater than the wire. The seal expansion tube 72 is a thin walled tube that has an inner cavity 82 that fits contiguously over the enlargend section 80 of the pin 70 such that a wire end can be received within the tube 72.

Figure 3B:
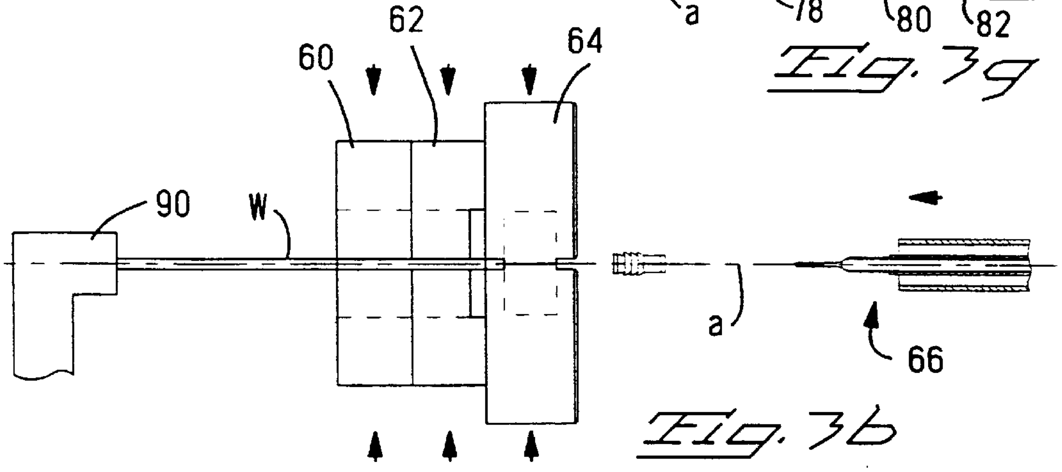
Figure 3C:
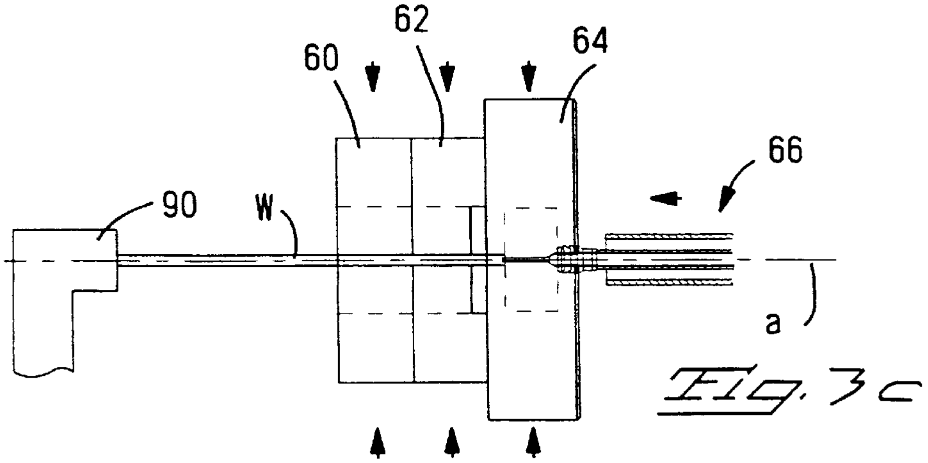
Figure 3D:
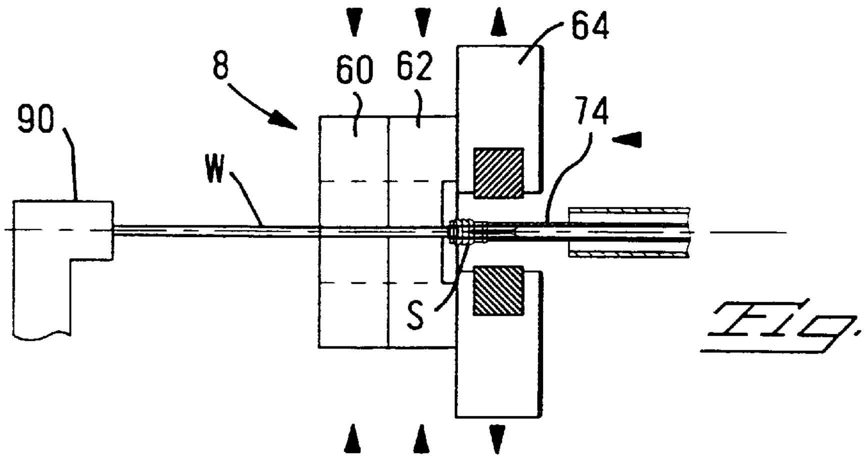
Figure 3E:
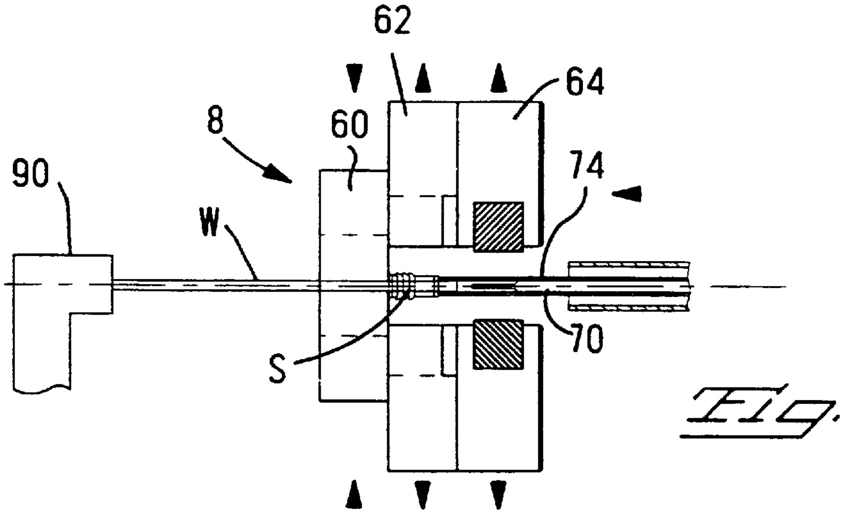
Figure 3F:
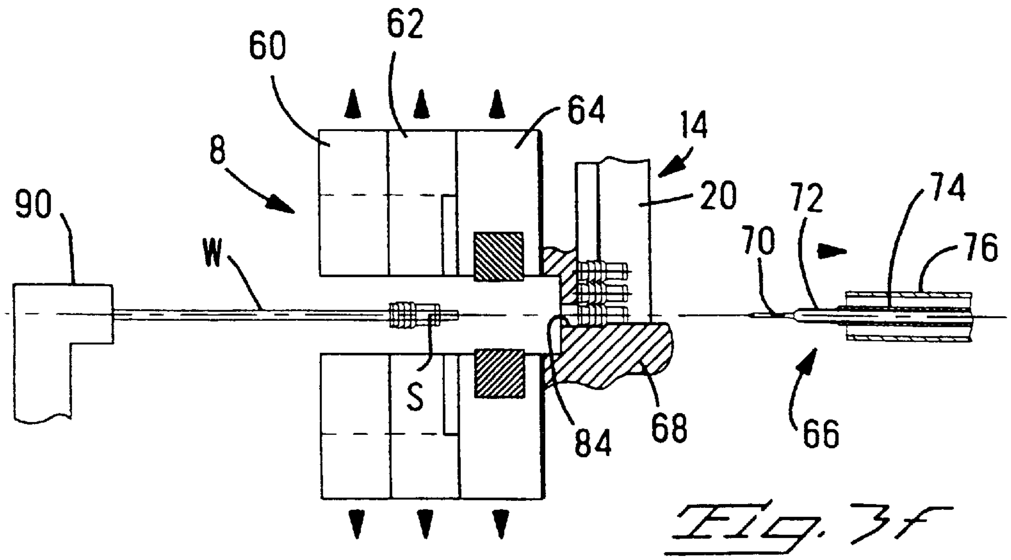

Referring to FIGS. 3*b*–3*f*, assembly of a seal to a wire end will be explained. In FIGS. 3*b*–3*f*, the feeding track 14 and base 68 are not shown, and the grippers and clamps are only shown schematically, for more clarity. Initially as shown in FIG. 3*b*, a wire end W is moved to the insertion unit 8 and clamped by the wire gripper 60 and the centering clamp 62, whereby the centering clamp ensures that the wire end for receiving the seal is aligned along the axis A. The insertion device 66 is then translated towards the seal until the pin front end 78 is inserted through the cavity of the seal. The seal then abuts the enlargend section 80 and is pushed through a hole 84 (see FIG. 1) until abutment with the seal abutment clamp 64. The seal insertion device 66 continues axial movement towards the seal and the seal is forced to expand over the enlargend section 80 and subsequently the expansion tube 72, which is possible due to the seals elastomeric properties, until the position shown in FIG. 3*c* where the seal removal tube 74 abuts an end of the seal. The seal abutment clamp is then opened as shown in FIG. 3*d* and the expansion tube 72 advances whilst the casing 76 and the pin 70 remain stationary. The seal removal tube 74 advances in unison with the seal expansion tube. Advancement of the seal expansion tube and seal removal tube 72 continues as shown in FIG. 3*e* over an end of the wire W subsequent to opening of the wire centering clamp 62. The expansion tube 72 is then retracted but the outer removal tube 74 remains in abutment with the seal such that the seal slides off the expansion tube and positions on the wire end, whereby the insertion device is retracted to the initial position as shown in FIG. 3*f*, the seal gripper 60 is opened and a new cycle can begin.

Due to all of the axial movements being performed by the insertion device 66, a simple gripping and feeding system for the wire end W can be utilized, which is particularly advantageous for simplification of the harness making machine where wire transport grippers 19 move along a conveyor in a wire conveying direction. The wire conveying grippers can be provided with a simple construction therefore being cost-effective, in particular with regard to the number of wire ends that are carried simultaneously along a conveyor, and because axial movement of the grippers is not necessary.

Advantageously therefore, a very slim, cost-effective and reliable seal sorting, feeding and insertion machine is provided that also effectively adapts to a modular harness-making-machine.

What is claimed is:

1. A seal processing station for use in a harness making machine, comprises a seal sorting and feeding section that has a seal sorting unit and seal feeding unit having a feed track, the seal sorting unit comprising a container for receiving loose seals therein, characterized in that the seal sorting unit comprises a seal propulsion device having a seal feed channel extending from a lower end of the container to an upper end, the channel comprising an air flow inlet for blowing air up the channel to feed seals from the lower end to the upper end.

2. The seal processing station of claim 1 wherein the container comprises an upper chamber and a lower chamber separated by a wall, the separation wall having an outlet at a bottom section for allowing seals to fall from the upper to the lower chamber.

3. The seal processing station of claim 2 wherein the feed track comprises an end extending into the container and positioned below the outlet.

4. The seal processing station of claim 2 wherein a seal flow control device is provided adjacent the outlet.

5. The seal processing station of claim 4 wherein the seal control device comprises a plate positioned below the outlet at a distance that is adjustable to vary the flow of seals.

6. The processing station of claim 4 wherein the seal flow control device is mounted to a vibration or movement motor to loosen seals that may get stuck at the outlet.

7. The processing station of claim 1 wherein the seal feed channel comprises a venturi for sucking seals into the channel.

* * * * *